United States Patent [19]

Wilson

[11] Patent Number: 4,580,879

[45] Date of Patent: Apr. 8, 1986

[54] IN-LINE OPTICAL ANAMORPHIC BEAM EXPANDER/CONTRACTOR

[75] Inventor: Scott D. Wilson, Adams County, Colo.

[73] Assignee: Storage Technology Partners II, Louisville, Colo.

[21] Appl. No.: 529,425

[22] Filed: Sep. 6, 1983

[51] Int. Cl.⁴ .............................. G02B 5/04
[52] U.S. Cl. ....................... 350/421; 350/286
[58] Field of Search ................. 350/421, 286

[56] References Cited

U.S. PATENT DOCUMENTS 3,871,750  3/1975  Mecklenborg .................. 350/484

FOREIGN PATENT DOCUMENTS 0091069  5/1959  Netherlands .................. 350/421

OTHER PUBLICATIONS

Hammer, "In-Line Anamorphic Beam Expanders", Applied Optics, vol. 21, No. 15, 8/1982-p. 2861.

*Primary Examiner*—John K. Corbin
*Assistant Examiner*—Rebecca D. Gass
*Attorney, Agent, or Firm*—Bryant R. Gold

[57] ABSTRACT

An in-line anamorphic light beam expanding/contracting device utilizing two prisms and a planar mirror surface. The planar mirror surface reflectively directs the optical path of a light beam between the two prisms and the prisms provide light beam expansion by refracting. The device allows for a diminutive device which is especially useful in computer peripheral optical data storage equipment.

10 Claims, 2 Drawing Figures

IN-LINE OPTICAL ANAMORPHIC BEAM EXPANDER/CONTRACTOR

BACKGROUND OF THE INVENTION

This invention, an anamorphic light beam expander, relates to the field of optical beam manipulation and in particular, to an in-line anamorphic light beam expander for use in optical disk data storage systems, wherein the active optical elements comprising the active optical path are either fixed stationary components or single unit optical elements.

Anamorphic light beam expanders utilizing optical prisms are well known in prior art optical systems. In the more sophisticated optical storage devices, however, it is desirable to reduce the number of optical components to a minimum in order to meet the space constraints dictated by the equipment design, to minimize transmission losses, and to reduce the number of elements which can contribute to alignment errors. Space restrictions have increased the need for simplification of known anamorphic optical expanders which utilize prisms only.

Beam expansion by multiple prism devices accomplished in the prior art poses tedious and lengthy calculations in order to establish the precise prism locations within the device. Additionally, the task of precision assembly becomes even more tedious with a plurality of components.

Two approaches have been used in the prior art to avoid the complicitly of design and construction of multiple prism beam expanders. In the first, use of a minimum number of prism components necessary to accomplish desired beam expansion; and in the second, use of prisms which make use of special incident angles, such as Brewster's angles, thereby simplifying arduous design calculations and construction.

The present invention is an improvement in that the light beam expanding/contracting device uses the minimum number of prisms necessary to perform the expansion/contraction required, and employs additional light beam directing optic elements to maintain precise light beam direction within the assembly.

SUMMARY OF THE INVENTION

The present invention is a simplified in-line anamorphic light beam expander/contractor which utilizes two prisms for expansion/contraction and a single reflective surface for directing the path of the light beam between the two prisms.

A propagating light beam impinging upon the face of the initial prism is caused to be refracted and expanded as it enters the first optical element, and is further refracted and expanded as it exits the optical element.

The second element of the device is flat planar reflective surface positioned directly in the beam path such that the light beam is reflected onto the entrance face of the second and final prism of the device.

The third element is a final prism-shaped optical element which causes the final expansion of the beam to occur when the partially expanded light beam enters the element. Further, the position of the third element with respect to the light beam path directs the propagated light beam along the same axis the beam was traveling when initially approaching the device.

Conversely, a light beam traveling through the device in the opposite direction would experience contracting. The amount of expansion/contracting is equivalent through the optical path of the device, thus the direction the light approaches the device determines whether the light beam will be expanded or contracted.

The present invention provides a unique assembly having fewer components than known prior art devices. This advantageously reduces the size of the device for use in highly compact areas; reduces the amount of light beam intensity loss, and enhances ease of assembly and alignment.

DESCRIPTION OF PREFERRED EMBODIMENT

The previously described and other objectives, features and advantages of the present invention will become more readily apparent in the detailed description of the preferred embodiment that refers to the listed drawings.

The following description sets forth the best presently assembled model in carrying out the present invention. This description is presented solely for the purpose of describing the essential principles of the present invention and should not be interpreted as limiting the true scope of the invention as outlined in the appended claims.

Figure 1:
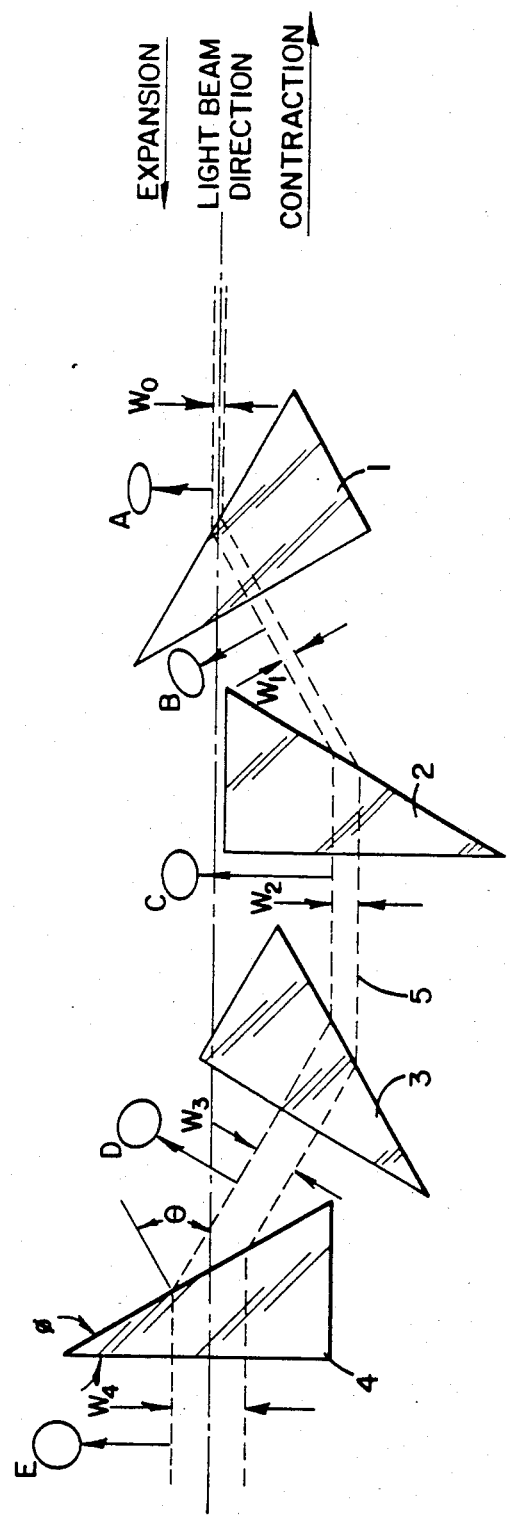
FIG. 1 is a schematic drawing of a four-prism system from a prior publication, showing the propagated light beam path, and the corresponding anamorphic expansion/contracting through each sequential prism.

In order to demonstrate the advantages and features of the present invention, it would be beneficial to describe in more detail a conventional prior art light beam expander/contractor as set forth in FIG. 1, which is a four-prism system having four identical prisms 1–4.

The optical path 5 of the device is shown as dashed lines with expansion occurring in the direction noted and contraction occuring in the opposite direction as shown.

It is noted in the prior art that a single anamorphic expansion occurs only at the entrance surface for each prism component. The light beam exits each prism normal to the exiting surface. Exiting normal to exit surface of the prism and does not cause refraction of the beam and as a consequence, does not effect expansion of the beam. Hence, an approaching light beam having cross sectional geometry A and cross section Wo impinging upon the entrance surface of prism 1 is refracted and anamorphically expanded to dimension W1 as illustrated by geometry B. The beam exits prism 1 normal to the exiting surface and is therefore unchanged at that point.

The same anamorphic expansion is repeated as the light beam propagates through the remaining three identical prisms 2, 3, and 4 as indicated by cross sectional geometry C, D and E, and cross sections W2, W3, and W4 respectively.

It is apparent that the prior art device of FIG. 1 is a highly specialized and unique light beam expander wherein all four prisms are identical. Further, the light beam impinges upon the entrance surface of each prism at angle Theta (approximately 57 degrees) and exits normal to the exiting surface. Convenience of calculating the true positions of the prism components with respect to one another is gained in this unique approach.

The four-prism approach of the prior art disadvantageously requires sufficient space to accommodate assembling four individual prisms which cannot overlap or come in contact with one another without position conflict between the elements of the device.

Traditional anamorphic light beam expanders are bulky and present awkward and tedious calculations in order to achieve true paraxial light beams which enter and exit the device. The prior art reveals attempts to simplify light beam expanders including use of identical prisms, special optical angles between the light beam path and the prism elements such as Brewster's angle, and selective optical coatings applied to various surfaces without position conflict between the elements of the device.

Figure 2:
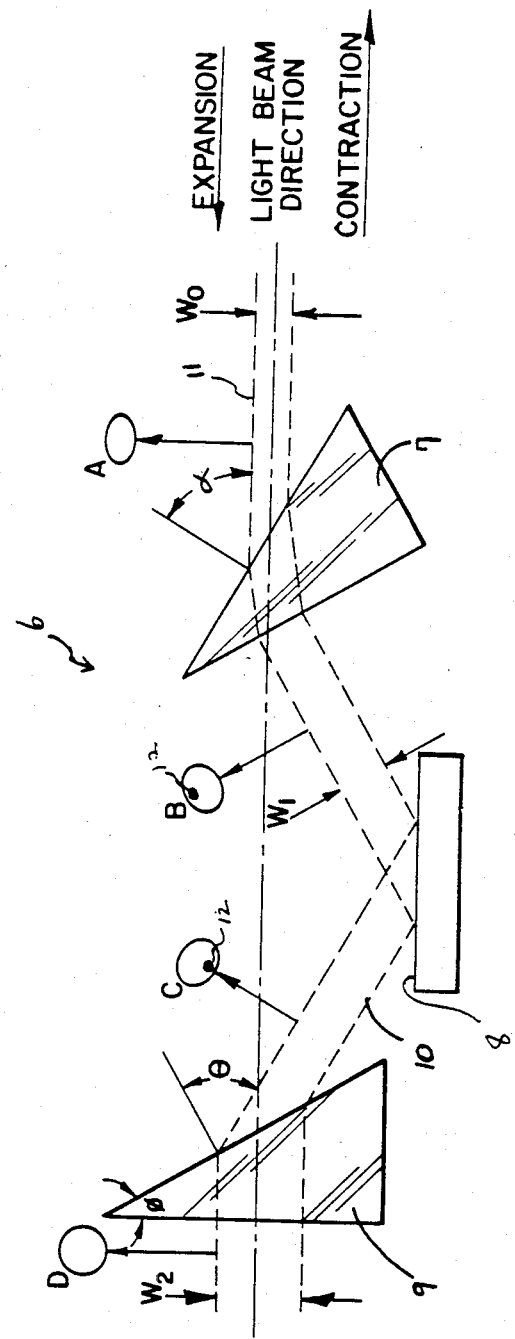
FIG. 2 is a representative schematic drawing of a prism-mirror-prism system configured according to the principles of the present invention, showing the same propagated light beam path detail as FIG. 1.

In contrast, the present invention 6 as illustrated in FIG. 2 utilizes only two prisms, 7 and 9, for anamorphic light beam expansion and a planar mirrored surface 8 for reflecting and directing the light beam between the two prisms 7 and 9. Use of a lesser quantity of components advantageously allows for constructing an anamorphic light beam expander/contractor of a substantially diminutive size.

In the present invention the optical path 10 is shown as the area within the dashed lines with expansion or contracting occurring in the direction as noted. It is important to note that within a prism system the amount of expansion or contracting of a light beam is dependent upon the approaching and departure angles of a light beam, the index of refraction of the prism and the apex angle of the prism. As a result, the amount of expansion or contraction effected requires selective geometry of the prisms based upon their index of refraction.

FIG. 2 illustrates an approaching light beam 11 having cross sectional geometry A and dimension Wo being refracted and expanded as it impinges the entrance surface of prism 7 at an angle alpha and is refracted to a width W1 and geometry B.

The beam 11 is then directed toward prism 9 by reflection from the planar reflective surface 8. The reflective surface 8 causes the light beam to become inverted within the direction of expansion as indicated by the index dot 12 shown at the top of geometry B and the bottom of geometry C.

The light beam 11 is again refracted and further expanded to width W2 and geometry D as it impinges the entrance surface of prism 9 at angle Theta. The light beam 11 ordinarily exits prism 9 perpendicular to the exiting surface without further refraction and paraxial to the original beam approaching prism 7. Advantageously, the position calculations for the prism elements are reduced to only two prisms and further reduced if the selected beam expansion may be accomplished with two identical prisms. Transmission characteristics are improved by employing Brewster's angle.

The above advantages and others are present for simplified design without sacrificing the overall diminutive size required in sophisticated and complex optical systems.

While seemingly a simple change, placing a planar mirror surface directly into the optical path as a light beam directive device as shown in FIG. 2 represents a significant advance in the art of designing light beam expanding/contracting devices. First, the planar mirror 8 replaces two prisms of the prior art and secondly the planar mirror position with respect to the optical path is primarily reduced to deciding the most desirous length of the optical path within the device. The closer the planar mirror is placed to the exiting point of the light beam from prism 7, the shorter the optical path becomes and as a result, deduces the size of the entire device.

In addition, the light intensity loss associated with a light beam entering a refracting surface is reduced in proportion to the reduction of said refracting surfaces thereby preserving the integrity of said light beam.

What is claimed:

1. A light beam transmissive device for expanding the cross-sectional area of a propagated light beam, comprising:

first means for partially expanding an incident light beam;

second means for fully expanding the partially expanded light beam and for aligning the fully expanded light beam propagation axis with the propagation axis of the incident light beam; and third means for directing the partially expanded light beam from said first means to said second means.

2. A light beam transmissive device according to claim 1, wherein the partially expanding first means comprises a prism, said prism oriented such that an incident light beam encountering a first surface and exiting a final surface is caused to be refracted and partially expanded.

3. A light beam transmissive device according to claim 1, wherein the fully expanding second means comprises a second prism, said prism oriented such that the partially expanded light beam is refracted and fully expanded when entering a first surface and exiting a final surface, and further oriented to cause said fully expanded exiting beam propagation axis to align with the propagation axis of the incident light beam approaching the device.

4. A light beam transmissive device according to claim 1, wherein the partially expanded light beam directing means comprises a reflective surface located in the direct path of the partially expanded beam and oriented to cause said partially expanded beam to be directed to the first surface of the second expanding means, said reflective surface being optically flat.

5. A light beam transmissive device comprising:

a first component optic having first and second non-parallel surfaces positioned in an optical path and oriented such that an incident light beam in the optical path encountering the first surface and exiting the second surface is caused to be refracted and partially expanded;

a second component optic having first and second non-parallel surfaces positioned in the optical path and oriented such that the partially expanded light beam is refracted and fully expanded when entering the first surface and exiting the second surface, and wherein said second component further causes said exiting fully expanded beam axis to conform to the axis of the incident light beam approaching the device; and a third component optic having a reflective surface positioned in the optical path and oriented such that the partially expanded light beam is directed to the first surface of the second component, said reflective surface being optically flat.

6. A light beam transmissive device for contracting the cross-sectional area of propagated light beam, comprising:

first means for partially contracting an incident light beam;

second means for fully contracting the partially contracted light beam and for aligning the fully contracted light beam propagation axis with the propagation axis of the incident light beam; and third means for directing the partially contracted light beam from said first means to said second means.

7. A light beam transmissive device according to claim 6, wherein the partially contracting first means comprises a prism, said prism oriented such that an incident light beam encountering a first surface and exiting a final surface of the prism is caused to be refracted and partially contracted.

8. A light beam transmissive device according to claim 6, wherein the fully contracting second means comprises a second prism, said prism oriented such that the partially contracted light beam is refracted and fully contracted when entering a first surface and exiting a final surface of the second prism, and the second prism is further oriented to cause said exiting beam propagation axis to align with the axis of the incident light beam approaching the device.

9. A light beam transmissive device according to claim 6, wherein the partially contracted light beam directing means comprises a reflective surface located in the direct path of the partially contracted beam and oriented to cause said partially contracted beam to be directed to the first surface of the second contracting means, said reflective surface being optically flat.

10. A light beam transmissive device comprising:

a first component optic having first and final non-parallel surfaces positioned in an optical path and oriented such that an incident light beam in the optical path encountering the first surface and exiting the final surface is caused to be refracted and partially contracted;

a second component optic having first and final non-parallel surfaces positioned in the optical path and oriented such that the partially contracted incident light beam is refracted and fully contracted when entering the first surface and exiting the final surface, and wherein said second component further causes said fully expanded exiting beam propagation axis to align with the propagation axis of the incident light beam approaching the device; and a third component optic having a reflective surface positioned in the optical path and oriented such that the partially contracted light beam is directed to the first surface of the second component, said reflective surface being optically flat.

* * * * *